US012761586B2

(12) United States Patent
Tanaka et al.

(10) Patent No.: US 12,761,586 B2
(45) Date of Patent: Oct. 13, 2026

(54) FIXING DEVICE

(71) Applicant: CANON KABUSHIKI KAISHA, Tokyo (JP)

(72) Inventors: Kenichi Tanaka, Ibaraki (JP); Rikiya Takemasa, Chiba (JP); Takeshi Kozuma, Ibaraki (JP); Tatsuo Yasui, Tokyo (JP); Tomoyuki Kuriyama, Tokyo (JP); Masaki Furutani, Chiba (JP); Takuya Hasegawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/193,545

(22) Filed: Apr. 29, 2025

(65) Prior Publication Data

US 2025/0341798 A1 Nov. 6, 2025

(30) Foreign Application Priority Data

May 2, 2024 (JP) ................................ 2024-074800
Apr. 2, 2025 (JP) ................................ 2025-061174

(51) Int. Cl.
*G03G 15/20* (2006.01)

(52) U.S. Cl.
CPC ..... *G03G 15/2025* (2013.01); *G03G 15/2064* (2013.01); *G03G 2215/2038* (2013.01); *G03G 2215/2051* (2013.01)

(58) Field of Classification Search
CPC ....... G03G 15/2025; G03G 2215/2035; G03G 2215/2038
See application file for complete search history.

(56) References Cited

U.S. PATENT DOCUMENTS

2007/0059064 A1* 3/2007 Okuda ................ G03G 15/206 399/329
2010/0316421 A1 12/2010 Komuro
(Continued)

FOREIGN PATENT DOCUMENTS

JP 2003195671 A 7/2003
JP 2009-116141 A 5/2009
(Continued)

OTHER PUBLICATIONS

Co-pending U.S. Appl. No. 19/204,786 to Kiyonori Sotome et al., filed May 12, 2025.
(Continued)

*Primary Examiner* — Carla J Therrien
(74) *Attorney, Agent, or Firm* — Venable LLP

(57) ABSTRACT

A fixing device includes an endless belt, a stretching roller, a tension roller and a lubricant supplying roller. The tension roller is movable between a first urging position where the tension roller urges the belt and a first urge releasing position where the tension roller does not urge the belt. The lubricant supplying roller is movable between a second urging position where the lubricant supplying roller urges the belt in a state in which the tension roller is positioned in the first urging position and a second urge releasing position where the lubricant supplying roller does not urge the belt. The lubricant supplying roller is moved from the second urging position to the second urge releasing position in interlocking with a moving operation of the tension roller from the first urging position to the first urge releasing position.

10 Claims, 6 Drawing Sheets

(56) References Cited

U.S. PATENT DOCUMENTS

| | | | | |
|---|---|---|---|---|
| 2011/0008085 | A1* | 1/2011 | Okamoto | G03G 15/2025 399/329 |
| 2021/0141322 | A1* | 5/2021 | Tatezawa | G03G 15/2064 |
| 2024/0295843 | A1* | 9/2024 | Tanaka | G03G 15/2064 |

FOREIGN PATENT DOCUMENTS

| | | | |
|---|---|---|---|
| JP | 4994626 | B2 | 8/2012 |
| JP | 2015059964 | A | 3/2015 |

OTHER PUBLICATIONS

Extended European Search Report dated Sep. 25, 2025 in counterpart European Patent Appln. No. 25172220.3.

* cited by examiner

FIXING DEVICE

FIELD OF THE INVENTION AND RELATED ART

The present invention relates to a fixing device which heats and fixes a toner image which is borne on a recording material.

An image forming apparatus such as a copier, a printer, a fax machine, and a multifunctional printer with a plurality of these functions includes a fixing device which fixes the toner image born on the recording material to the recording material. Conventionally, as a fixing device, a configuration, which conveys the toner image on the recording material while heating it in a nip portion which is formed by an endless belt member and a rotatable member, is known (Japanese Laid-Open Patent Application (JP-A) 2003-195671).

In the fixing device disclosed in JP-2003-195671, the nip portion is formed by using a nip portion forming member which nips the belt member between the rotatable members. In a case of forming the nip portion by using the nip portion forming member, it is known that an image defect may occur or an inner surface of the belt may be scraped due to an increased sliding resistance between the belt member and the nip portion forming member at the nip portion. Therefore, a configuration which reduces the sliding resistance by disposing a lubricant supplying roller which supplies a lubricant in an inside of the belt member and applying the lubricant to an inner peripheral surface of the belt member is widely used.

Furthermore, as disclosed in Japanese Laid-Open Patent Application (JP-A) 2015-59964, a configuration, which is provided with a tension roller which contacts the inner peripheral surface of the belt member and applies tension to the belt member, is also known as a fixing device in which the belt member is used.

SUMMARY OF THE INVENTION

A Principal object of the present invention is to provide a fixing device for heating a toner image born on a recording material and fixing on the recording material, the fixing device comprising: an endless belt member; a rotatable member configured to rotate in contact with an outer peripheral surface of the belt member; a nip portion forming member provided inside the belt member to oppose the rotatable member via the belt member and configured to form a nip portion to nip and convey the recording material between the belt member and the rotatable member; a stretching roller configured to stretch the belt member in contact with an inner peripheral surface of the belt member; a tension roller in contact with the inner peripheral surface of the belt member; a first urging member configured to urge the tension roller toward the belt member and to apply a tension to the belt member by the tension roller; a lubricant supplying roller configured to supply a lubricant to the belt member in contact with the inner peripheral surface of the belt member; and a second urging member configured to urge the lubricant supplying roller toward the belt member, wherein the tension roller is movable between a first urging position where the tension roller urges the belt member by the first urging member and a first urge releasing position where the tension roller does not urge the belt member regardless of an urging force of the first urging member, wherein the lubricant supplying roller is movable between a second urging position where the lubricant supplying roller urges the belt member by the second urging member in a state in which the tension roller is positioned in the first urging position and a second urge releasing position where the lubricant supplying roller does not urge the belt member regardless of an urging force of the second urging member, and wherein the lubricant supplying roller is moved from the second urging position to the second urge releasing position in interlocking with a moving operation of the tension roller from the first urging position to the first urge releasing position.

Further features of the present invention will become apparent from the following description of exemplary embodiments with reference to the attached drawings.

Figure 3:
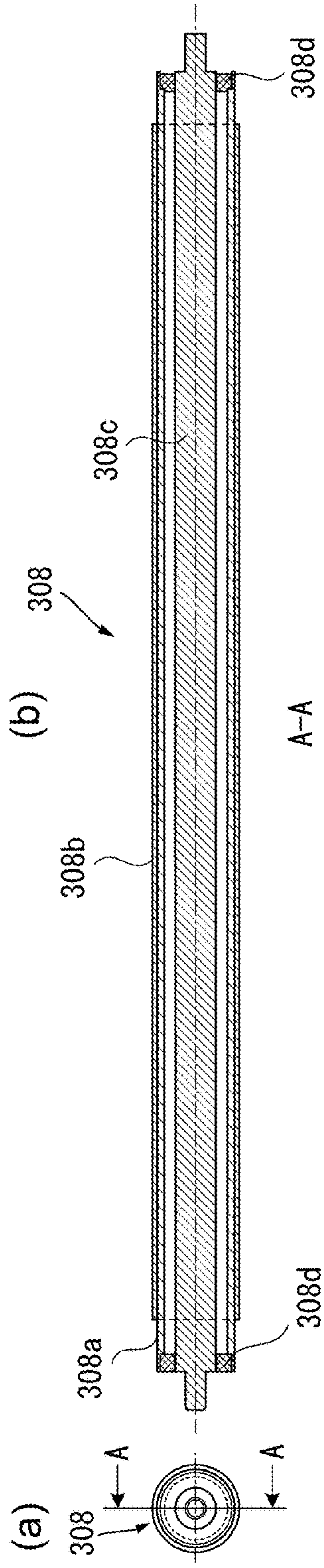

Part (a) of FIG. 3 is a sectional view of a schematic configuration showing a steering roller according to the embodiment, and part (b) of FIG. 3 is a sectional view along line A-A.

Figure 4:
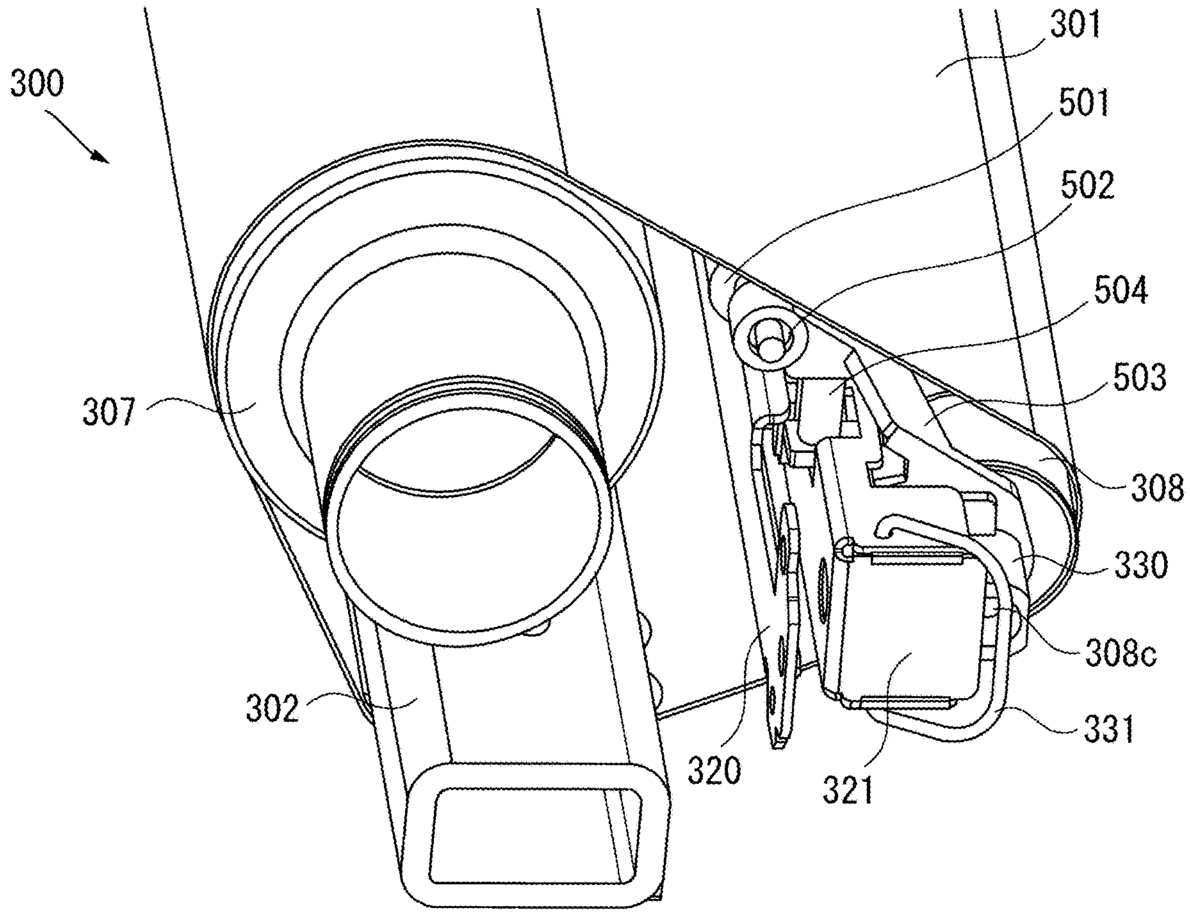

FIG. 4 is a perspective view showing an end portion configuration of the fixing device according to the embodiment.

Figure 5:
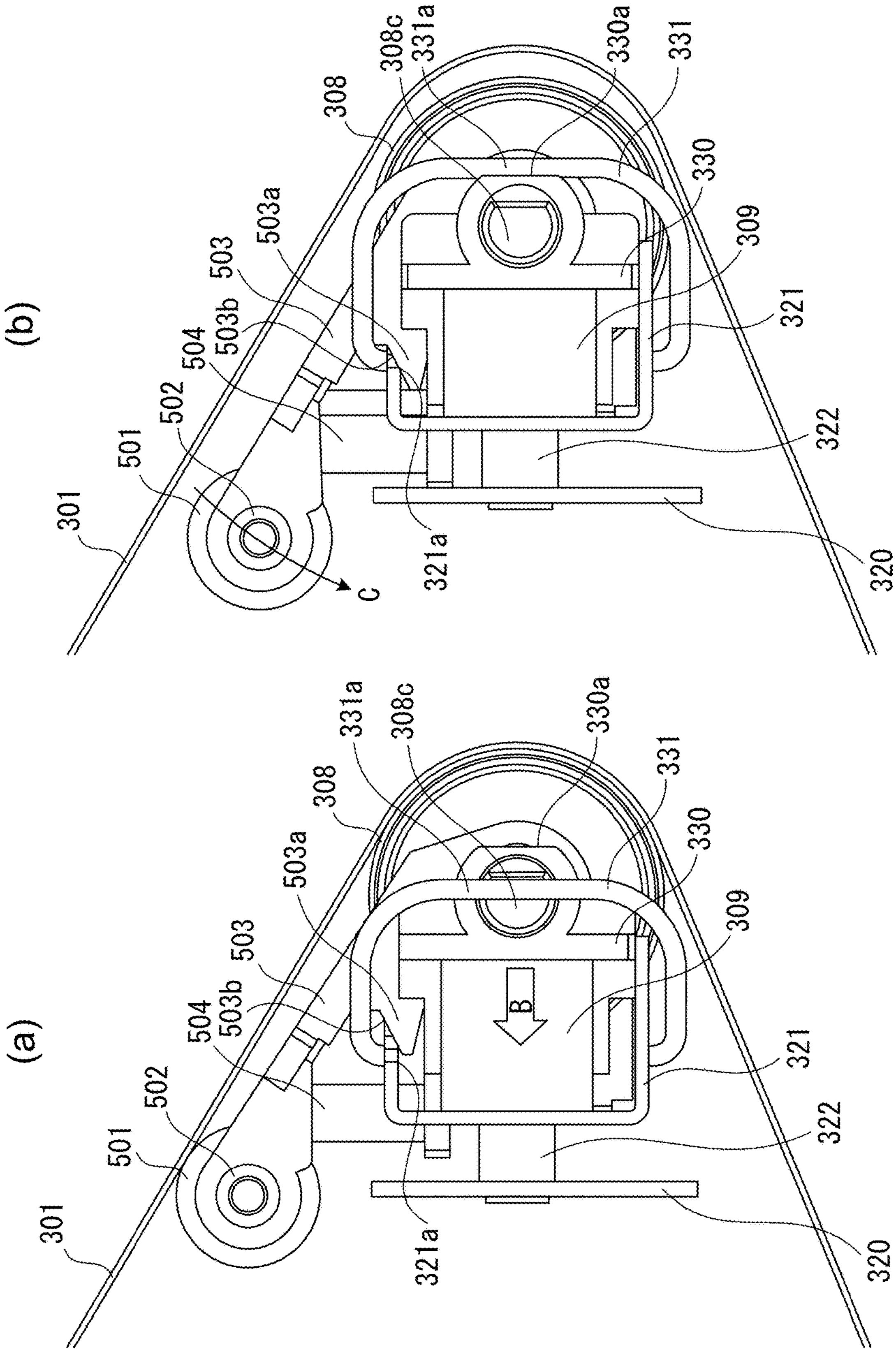

Part (a) and part (b) of FIG. 5 are views showing an end portion vicinity of a tension roller according to the embodiment when it is viewed from a width direction, part (a) of FIG. 5 is a view showing a state in which tension is applied to a fixing belt by the tension roller and a lubricant supplying roller, and part (b) of FIG. 5 is a view showing a state in which tension application to the fixing belt by the tension roller and the lubricant supplying roller is released.

Figure 6:
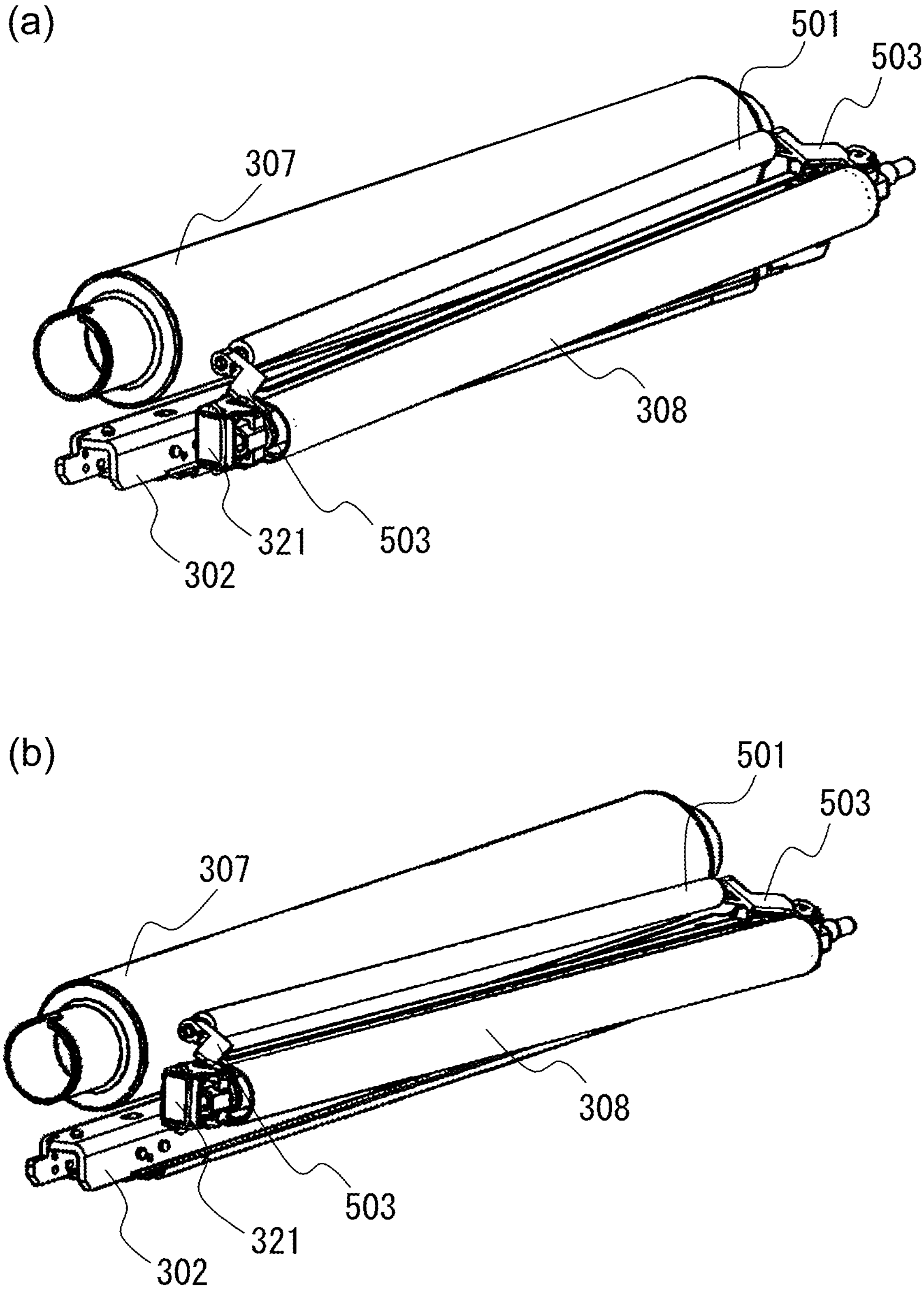

Part (a) and part (b) of FIG. 6 are perspective views showing a heating unit 300 when a steering operation is performed.

DESCRIPTION OF THE EMBODIMENTS

Figure 1:
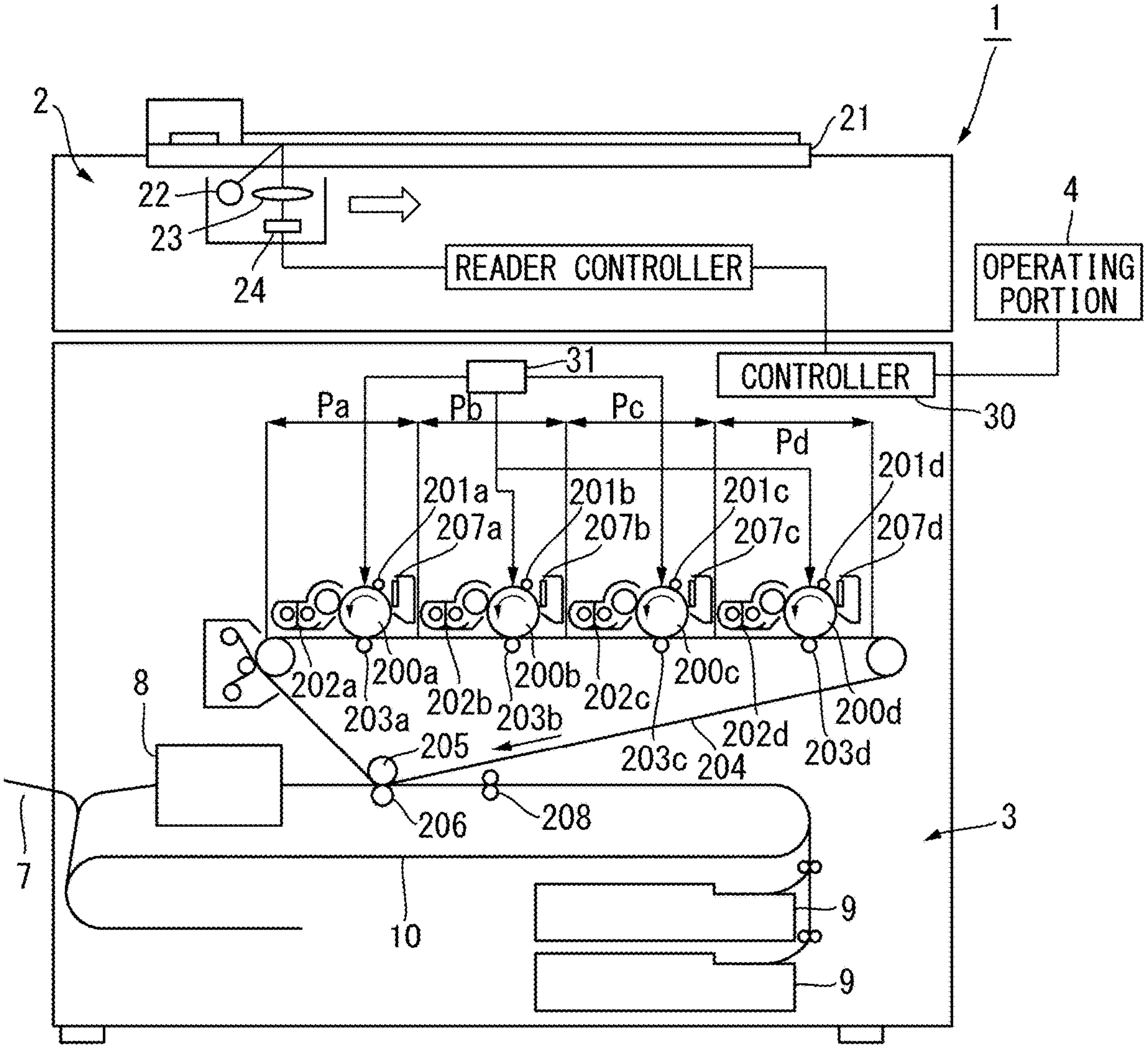
FIG. 1 is a sectional view of a schematic configuration showing an image forming apparatus according to an embodiment.

In the following, an embodiment of the present invention will be described with reference to FIG. 1 through part (b) of FIG. 5. First of all, a schematic configuration of the image forming apparatus according to the embodiment will be described by using FIG. 1.

Image Forming Apparatus

An image forming apparatus 1 is an electrophotographic full color printer which includes four image forming portions Pa, Pb, Pc and Pd which correspond to four colors of yellow, magenta, cyan and black. In the embodiment, the image forming apparatus 1 is a tandem type in which the image forming portions Pa, Pb, Pc and Pd are disposed along a rotational direction of an intermediary transfer belt 204 which will be described below. The image forming apparatus 1 forms a toner image (image) on a recording material according to an image signal from an image reading portion (document reading device) 2 which is connected to an image forming apparatus main assembly 3 or from a host device such as a personal computer which is communicatably connected to the image forming apparatus main assembly 3. As for the recording material, paper, plastic film, cloth, etc. may be used.

The image forming apparatus 1 is provided with an image reading portion 2 and the image forming apparatus main assembly 3. The image reading portion 2 reads a document (original) which is placed on a document mounting glass 21, and light which is irradiated from a light source 22 is reflected on the document and an image is formed on a CCD sensor 24 via an optical member 23 such as a lens. This type of optical unit converts the document into a series of electrical signal data columns for each line by scanning in a direction of an arrow. The image signal which is obtained by the CCD sensor 24 is sent to the image forming apparatus main assembly 3, and image processing is performed in a control portion 30 in accordance with each of the image forming portions which will be described below. Further, the control portion 30 also receives external input as an image signal from an external host device such as a print server.

The image forming apparatus main assembly 3 is provided with a plurality of image forming portions Pa, Pb, Pc and Pd, and image forming is performed in each of the image forming portions based on the image signal which is described above. That is, the image signal is converted into a laser beam which is pulse width modulated (PWM) by the control portion 30. A polygon scanner 31 as an exposure device scans the laser beam in accordance with the image signal. And the laser beam is irradiated onto photosensitive drums from 200*a* through 200*d* which are image bearing members for each of the image forming portions from Pa through Pd.

Incidentally, Pa is a yellow (Y) image forming portion, Pb is a magenta (M) image forming portion, Pc is a cyan (C) image forming portion, and Pd is a black (Bk) image forming portion, and each of the image forming portion forms an image of a corresponding color. The image forming portions from Pa through Pd are substantially same, therefore, details of the Y image forming portion Pa will be described in the following, and the descriptions of the other image forming portions will be omitted. In the image forming portion Pa, a toner image is formed on a surface of the photosensitive drum 200*a* according to the image signal, as will be described below.

A charging roller 201*a*, which is a primary charging device, charges the surface of the photosensitive drum 200*a* to a predetermined potential and prepares an electrostatic latent image formation. An electrostatic latent image is formed on the surface of the photosensitive drum 200*a*, which is charged to the predetermined potential, by a laser beam from the polygon scanner 31. A developing device 202*a* develops the electrostatic latent image on the photosensitive drum 200*a* and forms the toner image. A primary transfer roller 203*a* discharges from a back surface of the intermediary transfer belt 204, applies a primary transfer bias which is an opposite polarity to the toner and transfers the toner image on the photosensitive drum 200*a* to the intermediary transfer belt 204. After transferring the toner image, the surface of the photosensitive drum 200*a* is cleaned with a cleaner 207*a*.

Further, the toner image on the intermediary transfer belt 204 is conveyed to the next image forming portion, and the toner image of each color which is formed in each of the image forming portions in the order of Y, M, C and Bk are transferred, and four color images are formed on its surface. And the toner image, which passes through the Bk image forming portion Pd, which is located in a downstreammost of the intermediary transfer belt 204 with respect to a rotational direction, is conveyed to a secondary transfer portion, which is configured of a secondary transfer roller pair 205 and 206. And, in the secondary transfer portion, a secondary transfer electric field of an opposite polarity to the toner image on the intermediary transfer belt 204 is applied, and the toner image is transferred to the recording material.

The recording material is accommodated in a cassette 9, and the recording material which is fed from the cassette 9 is conveyed to a registration portion 208, which is configured of a pair of registration rollers, for example, and waits at the registration portion 208. After that, a timing is controlled to align a position of the toner image on the intermediary transfer belt 204 with the paper, and the registration portion 208 conveys the recording material to the secondary transfer portion.

The recording material onto which the toner image is transferred in the secondary transfer portion is conveyed to the fixing device 8, and the toner image which is born on the recording material is fixed to the recording material by heating and pressing in the fixing device 8. The recording material which is passed through the fixing device 8 is discharged into the discharge tray 7. Incidentally, in a case that image forming is performed on both sides of the recording material, after transferring and fixing of the toner image onto a first side (front side) of the recording material is finished, the recording material is passed through a reversing conveyance portion 10 and a front and back of the recording material is reversed, and the toner image is transferred and fixed on a second side (back side) of the recording material, and the recording material is stacked on the discharge tray 7.

Incidentally, the control portion 30 performs a control of the entire image forming apparatus 1 as described above. Further, the control portion 30 is capable of various settings, etc. based on an input from an operation portion 4 which the image forming apparatus 1 includes. The control portion 30 includes a CPU (Central Processing Unit), a ROM (Read Only Memory), and a RAM (Random Access Memory). The CPU controls each portion while reading out a program which corresponds to a control procedure which is stored in the ROM. Further, the RAM stores working data and input data, and the CPU performs control with reference to the data which are stored in the RAM which is based on the program, etc. which is described above.

Fixing Device

Figure 2:
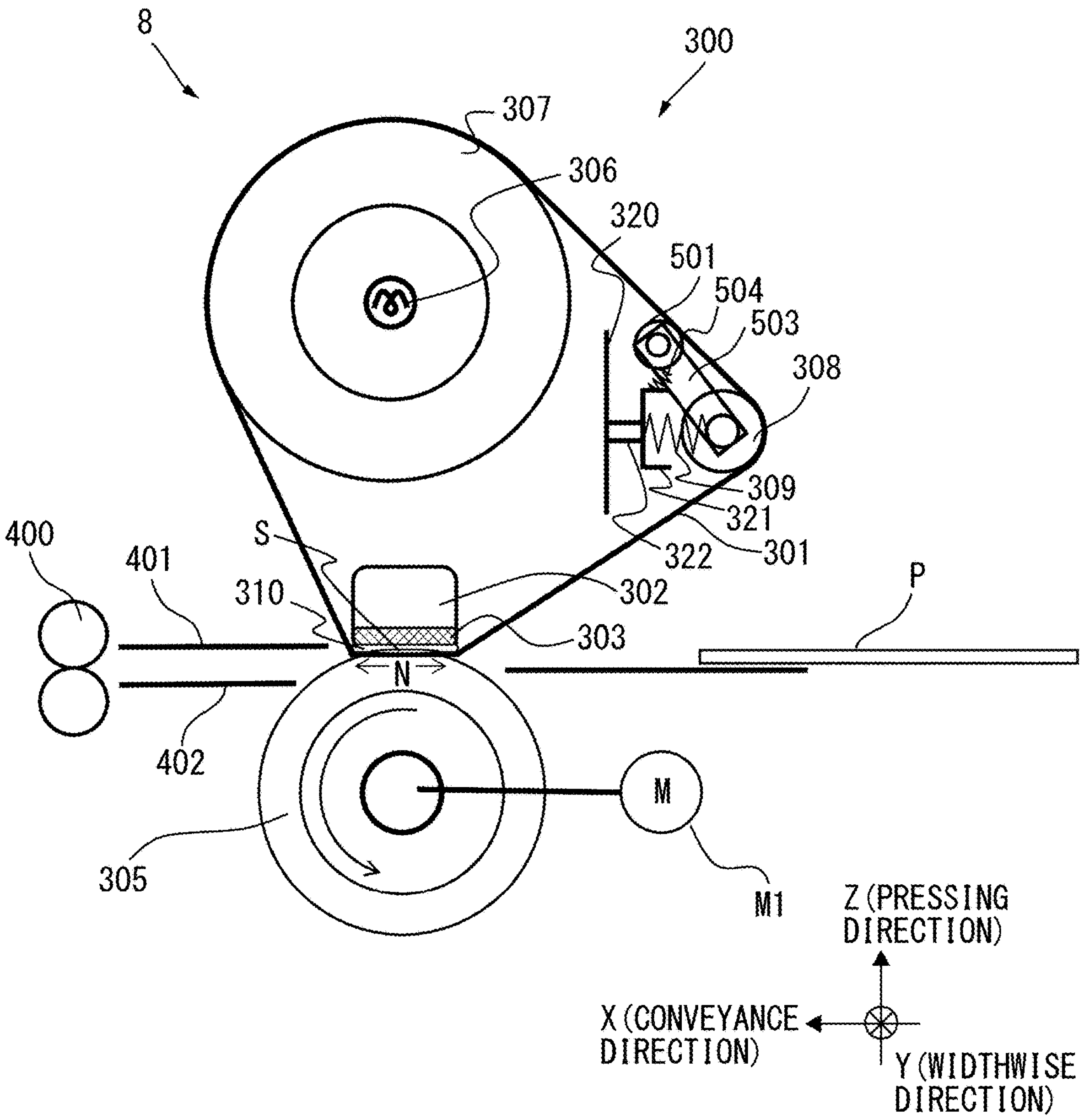
FIG. 2 is a sectional view of a schematic configuration showing a fixing device according to the embodiment.

Next, a configuration of the fixing device 8 according to the embodiment will be described by using FIG. 2. FIG. 2 is a sectional view schematically showing a general configuration of the fixing device 8. In the embodiment, a fixing device of a belt heating type, in which an endless belt is applied, is used. In FIG. 2, X direction is a direction in which a recording material Pis conveyed, Y direction is a width direction which intersects (interests perpendicularly in the embodiment) the direction in which the recording material Pis conveyed, and Z direction is a pressing direction of a pressing roller 305 which will be described below. These directions are mutually perpendicular. Further, one side of the width direction (the Y direction) is a front side of the image forming apparatus 1, and a side in which the operation portion 4 is disposed and a user operates, for example. On the other hand, the other side of the width direction is a back side of the image forming apparatus 1.

The fixing device 8 includes a heating unit 300 which includes a fixing belt 301 as an endless, rotatable belt member, and a pressing roller 305 which contacts the fixing belt 301 and forms a nip portion N with the fixing belt 301 as a rotatable member.

The heating unit 300 includes the fixing belt 301 which is described above, a fixing pad 303 as a nip portion forming member and a pad member, a stay 302, a heating roller 307 as a stretching roller, a steering roller 308 which also serves as a tension roller, and a lubricant supplying roller 501. The pressing roller 305 is also a driving rotatable member, which rotates while contacting an outer peripheral surface of the fixing belt 301 and provides a driving power to the fixing belt 301.

The fixing belt 301 exhibits heat conducting properties, heat resisting properties, etc. and is in thin-walled and cylindrical shape. In the embodiment, the fixing belt 301 is a three layer structure which consists a base layer, an elastic layer around an outer peripheral surface of the base layer, and a mold releasing layer around an outer peripheral surface of the elastic layer. And the base layer is 80 μm thick and made of polyimide resin (PI), the elastic layer is 300 μm thick and made of silicone rubber, and the mold releasing layer is 30 μm thick and made of PFA (Perfluoroalkoxy Alkane) as fluorocarbon resin. The fixing belt 301 is stretched by the fixing pad 303, the heating roller 307 and the steering roller 308. Further, a lubricant supplying roller 501 is disposed between the heating roller 307 and the steering roller 308 which are on an inner peripheral surface of the fixing belt 301, and it is pressed against the fixing belt 301.

The fixing pad 303 is non-rotatably disposed inside the fixing belt 301 so that it is opposing the pressing roller 305 while nipping the fixing belt 301. The fixing pad 303 forms the nip portion N which nips and conveys the recording material between the fixing belt 301 and the pressing roller 305. In the embodiment, the fixing pad 303 is a substantially plate shaped member which is long along a width direction of the fixing belt 301 (a longitudinal direction which intersects a rotational direction of the fixing belt 301, a rotational axis direction of the heating roller 307). The fixing nip portion Nis formed when the fixing pad 303 is pressed by the pressing roller 305 while the fixing pad is nipping the fixing belt 301. The fixing pad 303 is made of liquid crystal polymer (LCP) resin.

The fixing pad 303 is supported by the stay 302 as a supporting member which is disposed inside the fixing belt 301. That is, the stay 302 is disposed on an opposite side of the pressing roller 305 with respect to the fixing pad 303, and it supports the fixing pad 303. The stay 302 is a long and rigid reinforcing member along a longitudinal direction of the fixing belt 301, and it backs up the fixing pad 303 while contacting the fixing pad 303. That is, the stay 302 secures a pressing force at the nip portion N by giving strength to the fixing pad 303, when the fixing pad 303 is pressed by the pressing roller 305.

A lubricating sheet 310 whose surface is coated with PTFE (polytetrafluoroethylene), and a silicone oil S (hereafter, referred to as an oil S) are interposed between the fixing pad 303 and the fixing belt 301, so the fixing belt 301 is able to slide smoothly against the fixing pad 303. The lubricating sheet 310 is formed by coating PTFE onto a polyimide base material with a thickness of 70 μm.

Incidentally, since the lubricating sheet 310 is disposed to improve sliding properties between the fixing pad 303 and the fixing belt 301, it is possible to substitute the lubricating sheet 310 by applying a coating etc. which improves the sliding properties on the surface layer of the fixing pad 303.

The heating roller 307 is disposed inside the fixing belt 301 and stretches the fixing belt 301, together with the fixing pad 303 and the steering roller 308. The heating roller 307 is made of metal such as aluminum and stainless steel and formed into a cylindrical shape, and a halogen heater 306 as a heating member to heat the fixing belt 301 is mounted inside the heating roller 307. And the heating roller 307 is heated to a predetermined temperature by the halogen heater 306.

In the embodiment, the heating roller 307 is formed of a stainless steel pipe with a thickness of 1 mm, for example. Further, the halogen heater 306 may be a single unit or a plurality of units. Incidentally, the heating member which heats the heating roller 307 is not limited to a halogen heater, and it may be another type of heater such as a carbon heater which is capable of heating the heating roller 307. The fixing belt 301 is heated by the heating roller 307 which is heated by the halogen heater 306, and it is controlled to a predetermined target temperature according to a type of the recording material based on a temperature detection by a thermistor which is not shown in the figures.

The steering roller 308 is disposed on the inside of the fixing belt 301 and the steering roller 308 stretches the fixing belt 301 together with the fixing pad 303 and the heating roller 307, and the steering roller 308 is rotationally driven by the fixing belt 301. Further, in the embodiment, the steering roller 308 is urged toward the fixing belt 301 by an urging spring 309 as an urging member and is also a tension roller which applies a predetermined tension to the fixing belt 301.

The lubricant supplying roller 501 is disposed on the inside of the fixing belt 301, contacts the inner peripheral surface of the fixing belt 301 and supplies the lubricant to the fixing belt 301. In the embodiment, the lubricant supplying roller 501 is disposed so that it is inclinable in a direction which is parallel to a rotational axis direction of the heating roller 307 together with the steering roller 308, as will be specifically described below.

The pressing roller 305 rotates while contacting the outer peripheral surface of the fixing belt 301 and applies a driving force to the fixing belt 301. In the embodiment, the pressing roller 305 is a roller in which an elastic layer is formed on an outer peripheral surface of a shaft and a mold releasing layer is formed on an outer peripheral surface of an elastic layer. Further, the shaft is made of stainless steel with a diameter of 72 mm, the elastic layer is made of conductive silicone rubber with a thickness of 8 mm, and the mold releasing layer is made of PFA (Perfluoroalkoxy Alkane) as fluorocarbon resin with a thickness of 100 μm. The pressing roller 305 is rotatably supported by a movable pressing arm with respect to a fixing frame (unshown in the figures) of the fixing device 8, and a gear is fixed to one end portion of the pressing roller 305, and the pressing roller 305 is connected to a motor M1 as a pressing roller driving source via the gear and is rotationally driven.

In the fixing device 8 which is configured in this way, the toner image is heated while the recording material P, which bears the toner image, is nipped and conveyed at the nip portion which is formed between the fixing belt 301 and the pressing roller 305. And the toner image is fixed on the recording material P. Therefore, the fixing device 8 requires both a function applying heat and pressure and a function conveying the recording material P. The pressing roller 305 is pressed against the fixing pad 303 via the fixing belt 301 by a driving source which is unshown in the figures. In the embodiment, a pressing force at the nip portion N (NF) during image forming is 1600N, and a length in the X direction (conveying direction) set to be 24.5 mm and a length in the Y direction (width direction) is set to be 326 mm at the nip portion N.

Further, a discharging roller pair 400 which is used to discharge the recording material P which has passed through the nip portion N toward an outside of the fixing device 8, a separating plate 401 and a lower separating guide 402 are disposed on a downstream side of the nip portion with respect to the conveying direction of the recording material P. The separating plate 401 is disposed on the downstream side of the nip portion N with respect to the conveying direction of the recording material, and is disposed above the nip portion N in a vertical direction, and a leading end of the separating plate 401 is opposed in proximity to a vicinity of the nip portion N of the fixing belt 301. And the recording material P is separated from the fixing belt 301 after passing through the nip portion N.

The lower separating guide 402 is disposed on the downstream side of the nip portion N with respect to the conveying direction of the recording material, and is disposed below the nip portion N in the vertical direction, and a leading end of the lower separating guide 402 is opposed in proximity to the vicinity of the nip portion N of the pressing roller 305. And the lower separating guide 400*b* separates the recording material P from the pressing roller 305 in a case that the recording material P sticks to the pressing roller 305. Further, the lower separating guide 400*b* supports a lower surface of the recording material P which is discharged from the nip portion N and guides the recording material P to the discharging roller pair 400. The discharging roller pair 400 discharges the recording material P which is discharged from the nip portion N to the outside of the fixing device 8.

Steering Roller

Part (a) and part (b) of FIGS. 3 are sectional views of the steering roller 308. Part (a) of FIG. 3 is a sectional view of the steering roller 308 when it is sectioned in a direction which is perpendicular to a rotational axis of the steering roller 308, and part (b) of FIG. 3 is a sectional view of the steering roller 308 when it is sectioned in a direction which is along the rotational axis of the steering roller 308. The steering roller 308 includes a cylindrical member 308*a* as a rotatable shaft portion and an elastic layer 308*b* which is disposed around the cylindrical member 308*a*.

In the embodiment, the steering roller 308 is supported via a bearing 308*d* around a rotatable supporting shaft 308*c*. For example, the cylindrical member 308*a* is a stainless steel pipe, which is 20 mm in an outer diameter and 1 mm in a thickness, for example. Further, the elastic layer 308*b* is a silicone rubber layer which is 100 μm in a thickness, for example.

Further, as shown in part (b) of FIG. 3, the steering roller 308 is rotatably supported by the bearings 308*d* at both end portions of the steering roller 308 in a longitudinal direction (rotational axis direction). That is, the bearings 308*d* are disposed at both end portions of the rotatable supporting shaft 308*c* in the longitudinal direction, and the cylindrical member 308*a* is rotatably supported by the rotatable supporting shaft 308*c* via the bearings 308*d* at both end portions. Therefore, the steering roller 308 is rotationally driven with respect to the fixing belt 301, while it is supported by the rotatable supporting shaft 308*c* via the bearings 308*d*.

The steering roller 308 is disposed so that its rotational axis is inclinable in a direction which is parallel to the direction of the rotational axis (width direction, longitudinal direction) of the heating roller 307. And a position (shift position) of the fixing belt 301 with respect to the rotational axis direction of the heating roller 307 is controlled when the steering roller 308 is inclined. That is, the steering roller 308 has a rotation center at a center or one end portion in the rotational axis direction (longitudinal direction) of the steering roller 308, and it is inclined with respect to the longitudinal direction of the heating roller 307 when it swings around the rotation center. Therefore, a difference in tension occurs between one side and the other side of the fixing belt 301 in the longitudinal direction and the fixing belt 301 is moved in the longitudinal direction.

The fixing belt 301 may be shifted toward one of the end portions during rotation depending on an outer diameter accuracy of rollers which are stretched, an alignment accuracy between the rollers, etc. Therefore, the shift is controlled by the steering roller 308. Incidentally, the steering roller 308 may be swung by a driving source such as a motor, or it may be a configuration in which it is swung by automatic alignment.

The steering roller 308 according to the embodiment will be specifically described by using FIG. 2, FIG. 4 and part (a) and part (b) of FIG. 5. The steering roller 308 is disposed inside the fixing belt 301. The steering roller 308 stretches the fixing belt 301 and is also supported by a steering portion 321 as a supporting portion. In particular, the steering roller 308 is rotatably supported via the steering portion 321 to a frame 320 of the heating unit 300. The frame 320 is supported by the heating roller 307, the stay 302 and the fixing pad 303, and a unit is formed while being supported by front and back side panels which are not shown in the figure.

The steering portion 321 is supported so that a contact angle of the steering roller 308 to the fixing belt 301 can be changed by rotating around a rotating shaft 322 as a fulcrum against the frame 320. In this way, the position of the fixing belt 301 with respect to the width direction is controlled, by changing alignments of the steering roller 308 against other stretching members and developing a difference in tension between one side and the other side of the fixing belt 301 in the longitudinal direction.

Further, the end portions of the steering roller 308 are urged against the fixing belt 301 by the urging spring 309 as a first spring which is supported by the steering portion 321. That is, the urging spring 309 is disposed between the steering roller 308 and the steering portion 321, and it urges the steering roller 308 toward the inner peripheral surface of the fixing belt 301. The steering roller 308 also has a role as a tension roller which applies a predetermined tension force to the fixing belt 301.

As shown from FIG. 4 through part (b) of FIG. 5, the rotatable supporting shaft 308*c* of the steering roller 308 is rotatably supported by a pair of first bearing portions 330 at both end portions with respect to the rotational axis direction. The first bearing portion 330 is made of a resin material which is possible to use under a high temperature environment, such as PPS (Polyphenylene Sulfide). Further, the first bearing portion 330 is mounted so that it is possible to move along a side wall of the steering portion 321 which is box shaped. The side wall of the steering portion 321 is formed in a direction which is along urging direction of the urging spring 309. Further, the urging spring 309 is disposed between the first bearing portion 330 and the steering portion 321.

The steering roller 308 is urged against the fixing belt 301 by a force of 20N, for example, when the first bearing portion 330 is pressed by the urging spring 309 which is supported by the steering portion 321. The steering roller 308 is possible to move between a first urging position (position shown in part (a) of FIG. 5), in which the steering roller 308 urges the fixing belt 301 by the urging spring 309, and a first urge releasing position (position shown in part (b) of FIG. 5) in which the steering roller 308 does not urge the fixing belt 301 regardless of the urging force of the urging spring 309. That is, the steering roller 308 is possible to move between the first urging position and the first urge releasing position along the side wall of the steering portion 321.

Lubricant Supplying Roller 501

As shown in FIG. 2, the lubricant supplying roller 501 is disposed inside the fixing belt 301, and it contacts the inner peripheral surface of the fixing belt 301 and supplies lubricant to the fixing belt 301. The lubricant supplying roller 501 includes, for example, a core metal portion and an oil impregnated layer as a lubricant impregnated layer which is disposed around the core metal portion. The core metal portion is a roller shaft portion which is made of material such as aluminum, iron, and stainless steel. The oil impregnated layer is a layer in which lubricant is impregnated, and it contacts the inner peripheral surface of the fixing belt 301 when it is provided around the core metal portion of the lubricant supplying roller 501. The oil impregnated layer is 100 μm in thickness, for example, and is formed by winding a nonwoven fabric which is impregnated with a lubricant (for example, silicone oil) around the core metal. However, the oil impregnated layer is not limited to this. The oil impregnated layer may be made of organic or inorganic porous material such as sponge or porous ceramics, or organic or inorganic woven fabrics such as cloth or polyester fiber.

As shown from FIG. 4 through part (b) of FIG. 5, second bearing portions 502 are disposed at both end portions of the lubricant supplying roller 501 with respect to the rotational axis direction, and the second bearing portions 502 at both end portions are held by swing arms 503, respectively. Therefore, the lubricant supplying roller 501 is rotatably supported by the second bearing portions 502 with respect to the swing arms 503. Further, the swing arms 503 are disposed so that they are able to swing around the rotatable supporting shaft 308*c* of the steering roller 308. Therefore, the swing arms 503 support the second bearing portions 502 so that they are able to swing with respect to the steering roller 308.

Further, a pressing spring 504 as a second urging portion is disposed between the first bearing portion 330 and the swing arm 503. And the pressing spring 504 urges the lubricant supplying roller 501 toward the inner peripheral surface of the fixing belt 301, and the lubricant supplying roller 501 contacts the inner peripheral surface of the fixing belt 301 by the pressing spring 504 with a force of 3.0N.

The lubricant supplying roller 501 is capable of moving between a second urging position (position in part (a) of FIG. 5) in which the lubricant supplying roller 501 urges the fixing belt 301 by the pressing spring 504 while the steering roller 308 is positioned in the first urging position, and a second urge releasing position (position (b) in FIG. 5) in which the lubricant supplying roller 501 does not urge the fixing belt 301 regardless of an urging force of the pressing spring 504. That is, the lubricant supplying roller 501 is possible to move between the second urging position and the second urge releasing position when the swing arm 503 swings. Further, the pressing spring 504 urges the swing arm to move in the direction from the second urge releasing position to the second urging position.

Incidentally, the lubricant supplying roller 501 is supported by the steering roller 308 via the swing arm 503. Therefore, the lubricant supplying roller 501, along with the steering roller 308, is inclinable in a direction which is parallel to the rotational axis direction of the heating roller 307. That is, the lubricant supplying roller 501 inclines along with the steering roller 308 in case that the steering roller 308 inclines in order to perform the shift control.

Operations of Steering Roller and Lubricant Supplying Roller During Steering Operation Next, operations of the steering roller 308 and the lubricant supplying roller 501 during steering operation in the embodiment will be described by FIG. 2 and part (a) and part (b) of FIG. 6. Part (a) of FIG. 6 and part (b) of FIG. 6 are perspective views of the heating unit 300 when steering operation is performed and show two patterns of steering angles. For ease of understanding, the fixing belt 301 is not shown in the figures. As described above, the steering portion 321 is supported so that the contact angle to the fixing belt 301 can be changed and is supported so that it is inclinable by rotating around the rotating shaft 322 as the fulcrum against the frame 320. When the steering roller 308 inclines, the lubricant supplying roller 501, which is pivotally supported by the swing arm 503 along with the rotatable supporting shaft 308*c*, is also configured to perform inclining operation integrally with the steering roller 308 as approximately parallel to it. Since the fixing belt 301 near the steering roller 308 also twists accordingly during the steering operation, it is suitable for stabilizing the contact pressure of the lubricant supplying roller 501 against the fixing belt 301 and the rotational movement of the fixing belt 301 is also stabilized. Furthermore, it is also desirable that the steering roller 308 and the lubricant supplying roller 501 are operated integrally during a pressure releasing operation which will be described below.

Pressure Releasing of the Steering Roller and the Lubricant Supplying Roller

Next, a configuration of pressure releasing of the steering roller 308 and the lubricant supplying roller 501 against the fixing belt 301 in the embodiment will be described by using part (a) and part (b) of FIG. 5. Part (a) of FIG. 5 is showing a state in which pressure is applied to the fixing belt 301 from the steering roller 308 and the lubricant supplying roller 501. Part (b) of FIG. 5 is showing a state in which the pressure of the steering roller 308 and the lubricant supplying roller 501 against the fixing belt 301 is released.

In the embodiment, the device includes a tapered portion 503*a* as an interlocking portion which moves the lubricant supplying roller 501 from the second urging position to the second urge releasing position in interlocking with a moving operation of the steering roller 308 from the first urging position to the first urge releasing position. The tapered portion 503*a* is provided with the swing arm 503. And the tapered portion 503*a* swings the swing arm 503 so that the lubricant supplying roller 501 moves from the second urging position to the second urge releasing position by engaging the steering portion 321 while the steering roller 308 moves from the first urging position to the first urge releasing position.

The steering portion 321 includes an engaged portion 321*a* which is engageable with the tapered portion 503*a*. The engaged portion 321*a* is an end portion of a side wall of the steering portion 321 which is formed in a shape of a box, for example. In the tapered portion 503*a*, an inclined surface 503*b* is a surface which engages the engaged portion 321*a*. The inclined surface 503*b* is inclined so that the swing arm 503 moves in a direction of an arrow C in part (b) of FIG. 5, that is, in a direction in which the lubricant supplying roller 501 moves away from the inner peripheral surface of the fixing belt 301, by engaging the tapered portion 503*a* with the engaged portion 321*a*, when the swing arm 503 moves in a direction which is opposite to the urging direction of the urging spring 309 (in a direction of an arrow B in part (a) of FIG. 5).

Incidentally, the interlocking portion is not limited to the tapered portion 503*a* which is provided integrally with the swing arm 503, and it may be, for example, provided separately from the swing arm 503 and may move the lubricant supplying roller 501 from the second urging position to the second urge releasing position by engaging the steering portion 321. Further, the interlocking portion may be a link mechanism which swings the swing arm 503 in interlocking with the movement of the steering roller 308.

Further, in the embodiment, the device includes a locking member 331 which locks the steering roller 308 at the first urge releasing position. The locking member 331 is provided in the steering portion 321, and it holds the steering roller 308 at the first urge releasing position by hooking onto a hook portion 330*a* of the first bearing portion 330 of the steering roller 308 which is moved to the first urge releasing position. The locking member 331 is a substantially ring shaped member which is rotationally supported by the steering portion 321, and it is possible to hook a part of the ring onto the hook portion 330*a*. The hook portion 330*a* is an outer peripheral surface of a part of the first bearing portion 330 in which the rotatable supporting shaft 308*c* is engaged, and a flat surface which is formed on a downstream side with respect to the urging direction of the urging spring 309 (in a direction which is opposite to the direction of the arrow B in part (a) of FIG. 5. The locking member 331 includes a straight portion 331*a* so that it is easier to engage the hook portion 330*a* which is the flat surface. And when the straight portion 331*a* of the locking member 331 hooks onto the hook portion 330*a*, a position of the steering roller 308 with respect to the steering portion 321 is determined and the steering roller 308 is held at the first urge releasing position.

Next, an operation of releasing pressure of the steering roller 308 and the lubricant supplying roller 501 on the fixing belt 301 will be described. First, as shown in part (a) of FIG. 5, while the steering roller 308 is in a state that it is positioned at the first urging position, a force in the direction which is opposite to the urging force of the urging spring 309 to the first bearing portion 330 (in the direction of the arrow B in part (a) of FIG. 5) is applied, and the steering roller 308 is moved to the first urge releasing position which is shown in part (b) of FIG. 5. And at the position, it becomes possible to release the pressure of the steering roller 308 on the fixing belt 301 by hooking the locking member 331 on the first bearing portion 330 and regulating the movement of the steering roller 308.

The swing arm 503 is disposed so that it is possible to swing around the rotatable supporting shaft 308*c* of the steering roller 308. Therefore, when the rotatable supporting shaft 308*c* of the steering roller 308 also moves in accordance with the movement of the first bearing portion 330 as described above, the swing arm 503 also moves in the direction of the arrow B by being interlocked.

In the swing arm 503, the tapered portion 503*a* as the interlocking portion is formed as described above, and when the swing arm 503 moves in the direction of the arrow B, the inclined surface 503*b* of the tapered portion 503*a* contacts the engaged portion 321*a* of the steering portion 321. And when the swing arm 503 moves further in the direction of the arrow B from this state, the inclined surface 503*b* and the engaged portion 321*a* slide each other and the swing arm 503 is rotated in a direction in which the lubricant supplying roller 501 spaces away from the fixing belt 301 (the direction of the arrow C in part (b) of FIG. 5. Therefore, the lubricant supplying roller 501 moves in a direction away from the fixing belt 301, it is possible to release the pressure of the lubricant supplying roller 501 on the fixing belt 301.

In this way, it is possible to flex the fixing belt 301 sufficiently by releasing the pressure of the steering roller 308 and the lubricant supplying roller 501, and it is possible to remove the fixing belt 301 by pulling it from the fixing pad 303, the stay 302, the heating roller 307, the steering roller 308 and the lubricant supplying roller 501 in the longitudinal direction.

Incidentally, in a case that the fixing belt 301 is removed and a new fixing belt 301 is applied to the heating unit 300 in this way, the fixing belt 301 is mounted in the longitudinal direction so that the fixing pad 303, the stay 302, the heating roller 307, the steering roller 308 and the lubricant supplying roller 501 are positioned on the inside of the fixing belt 301 while the pressure of the lubricant supplying roller 501 on the fixing belt 301 is released, as described above. And the locking member 331 is released. That is, the straight portion 331*a* of the locking member 331 is released from the hook portion 330*a*. Then, the steering roller 308 moves toward the inner peripheral surface of the fixing belt 301 due to the urging force of the urging spring 309, and in accordance with the movement, the swing arm 503 also moves and the engagement between the taper portion 503*a* and the steering portion 321 is released. As a result, the steering roller 308 urges the fixing belt 301 by the urging spring 309, and the lubricant supplying roller 501 urges the fixing belt 301 by the pressing spring 504, so tension is applied to the fixing belt 301 by the steering roller 308 and the lubricant supplying roller 501.

In recent years, an outer diameter of the fixing belt 301 tends to be smaller due to miniaturization of the fixing device 8, so it is difficult to secure an amount of retraction of a roller which applies tension to the fixing belt 301 for replacing the fixing belt 301. On the other hand, in the embodiment, since the release of the tension which is applied to the fixing belt 301 by retracting the two rollers from the fixing belt 301, it is possible to flex the fixing belt 301 sufficiently even when the outer diameter of the fixing belt 301 is small and the amount of retraction of each roller is not secured due to the miniaturization of the fixing device 8.

Further, in the embodiment, the pressure of the lubricant supplying roller 501 on the fixing belt 301 is released in interlocking with the operation of the release of the pressure of the steering roller 308 on the fixing belt 301. Therefore, it is possible to release the tension which is applied to the fixing belt 301 without having to move the steering roller 308 and the lubricant supplying roller 501 separately. Further, even when the fixing belt 301 is mounted, the lubricant supplying roller 501 moves in interlocking with the movement of the steering roller 308 by releasing the locking member 331. As a result, it is possible to easily shift from a state in which the tension is released to a state in which tension is applied to the fixing belt 301 by the steering roller 308 and the lubricant supplying roller 501. Therefore, it is possible to easily perform the operation of replacing the fixing belt 301 in the fixing device 8 which is miniaturized.

OTHER EMBODIMENTS

In the embodiment which is described above, the configuration in which the halogen heater is provided with the heating roller as the heating portion which heats the fixing belt. However, the heating portion may be provided with the other stretching member instead of the heating roller. Further, the heating portion may be provided with the pad member. For example, a heating member whose shape is plate such as such as a ceramic heater may be provided on a side of the fixing belt of the pad member. Further, the fixing belt may be also heated by electromagnetic induction. Further, in the embodiments which are described above, an external heating method, in which the fixing belt is heated by contacting another heating member with the belt or the roller from outside, may be applied, instead of the heating portion which is disposed inside the roller.

Further, in the embodiment which is described above, a configuration, which applies the pressing roller as the driving rotatable member, is described. However, the driving rotatable member may be an endless belt which is stretched by a plurality of stretching rollers and driven by any of the stretching rollers. Further, in the embodiment which is described above, the pressing roller as the driving rotatable member is pressed against the belt to form the nip portion, however, the belt may also be pressed against the driving rotatable member. Furthermore, in the embodiment which is described above, a configuration, in which the fixing pad is applied as the nip portion forming member, is described, however, the nip portion forming member may also be a roller.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2024-074800 filed on May 2, 2024 and 2025-061174 filed on Apr. 2, 2025, which are hereby incorporated by reference herein in their entirety.

What is claimed is:

1. A fixing device for heating a toner image born on a recording material and fixing on the recording material, the fixing device comprising:
- an endless belt member;
- a rotatable member configured to rotate in contact with an outer peripheral surface of the belt member;
- a nip portion forming member provided inside the belt member to oppose the rotatable member via the belt member and configured to form a nip portion to nip and convey the recording material between the belt member and the rotatable member;
- a stretching roller configured to stretch the belt member in contact with an inner peripheral surface of the belt member;
- a tension roller in contact with the inner peripheral surface of the belt member;
- a first urging member configured to urge the tension roller toward the belt member and to apply a tension to the belt member by the tension roller;
- a lubricant supplying roller configured to supply a lubricant to the belt member in contact with the inner peripheral surface of the belt member; and
- a second urging member configured to urge the lubricant supplying roller toward the belt member,
- wherein the tension roller is movable between a first urging position where the tension roller urges the belt member by the first urging member and a first urge releasing position where the tension roller does not urge the belt member regardless of an urging force of the first urging member,
- wherein the lubricant supplying roller is movable between a second urging position where the lubricant supplying roller urges the belt member by the second urging member in a state in which the tension roller is positioned in the first urging position and a second urge releasing position where the lubricant supplying roller does not urge the belt member regardless of an urging force of the second urging member, and wherein the lubricant supplying roller is moved from the second urging position to the second urge releasing position in interlocking with a moving operation of the tension roller from the first urging position to the first urge releasing position.

2. The fixing device according to claim 1, further comprising an interlocking portion configured to axially and rotatably support the lubricant supplying roller to a rotational shaft of the tension roller so that the lubricant supplying roller and the tension roller are integrally movable.

3. The fixing device according to claim 2, further comprising:
- a frame configured to support the stretching roller and the nip portion forming member; and
- a support portion supported by the frame,
- wherein the interlocking portion moves the lubricant supplying roller from the second urging position to the second urge releasing position by engaging the support portion while the tension roller moves from the first urging position to the first urge releasing position.

4. The fixing device according to claim 3, further comprising:
- a first bearing portion configured to rotatably support an end portion of the tension roller in a rotational axis direction thereof;
- a second bearing portion configured to rotatably support an end portion of the lubricant supplying roller in a rotational axis direction thereof; and
- a swing arm configured to swingably support the second bearing portion to the tension roller,
- wherein the interlocking portion is provided in the swing arm and causes the swing arm to swingably move so that the lubricant supplying roller moves from the second urging position to the second urge releasing position by engaging the support portion while the tension roller moves from the first urging position to the first urge releasing position.

5. The fixing device according to claim 4, wherein the first urging member is disposed between the first bearing portion and the support portion, and
- wherein the second urging member is disposed between the swing arm and the first bearing portion and urges the swing arm in a direction from the second urge releasing position toward the second urging position of the lubricant supplying roller.

6. The fixing device according to claim 1, wherein the tension roller is disposed so that a rotational axis thereof is inclinable in a direction parallel to a rotational axis direction of the stretching roller and controls a position of the belt member with respect to the rotational axis direction of the stretching roller by inclining.

7. The fixing device according to claim 1, further comprising a locking member configured to lock the tension roller in the first urge releasing position.

8. The fixing device according to claim 1, wherein the stretching roller includes a heating portion thereinside and is a heating roller configured to heat the belt member by the stretching roller being heated by the heating portion.

9. The fixing device according to claim 1, wherein the nip portion forming member is a pad member.

10. The fixing device according to claim 1, further comprising an interlocking portion configured to support a shaft end portion of the tension roller and a shaft end portion of the lubricant supplying roller, wherein by the interlocking portion, the lubricant supplying roller is moved from the second urging position to the second urge releasing position in interlocking with a moving operation of the tension roller from the first urging position to the first urge releasing position.

* * * * *